Dec. 6, 1949     G. LEVESQUE DU ROSTU     2,490,311
DEVICE FOR THE SELF-ADJUSTMENT OF THE HEIGHT
OF MOTOR VEHICLES ABOVE THE GROUND
Filed Oct. 26, 1946
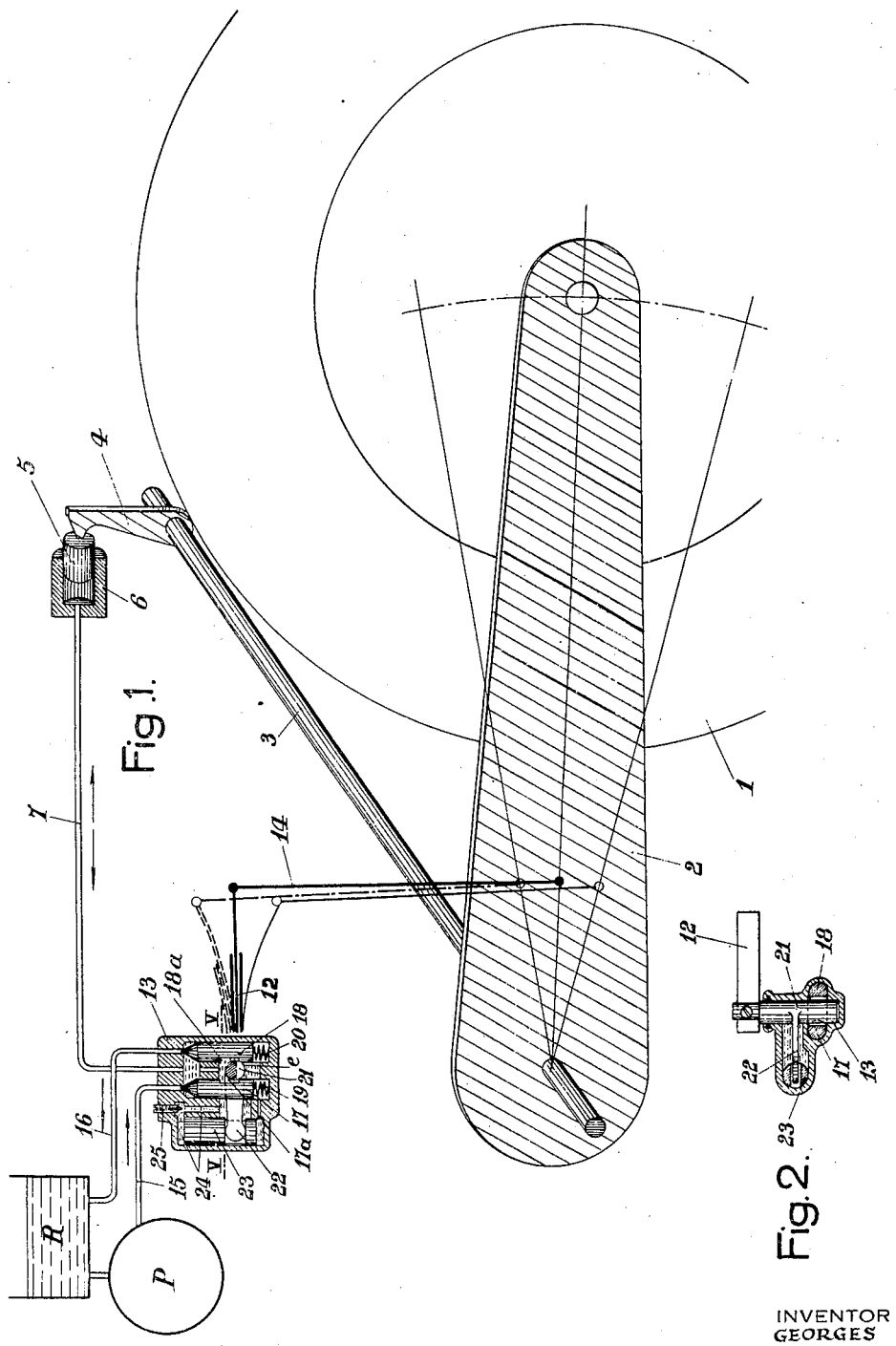
INVENTOR
GEORGES
LEVESQUE DU ROSTU
BY
ATTORNEY Patented Dec. 6, 1949

2,490,311

UNITED STATES PATENT OFFICE 2,490,311

DEVICE FOR THE SELF-ADJUSTMENT OF THE HEIGHT OF MOTOR VEHICLES ABOVE THE GROUND

Georges Levesque du Rostu, Paris, France, assignor to Société Anonyme André Citroen, Paris, France, a body corporate of France Application October 26, 1946, Serial No. 706,029
In France June 5, 1946

8 Claims. (Cl. 280—124)

This invention relates to motor vehicles chassis supporting gear and more particularly to spring gear for regulating the height of the chassis above ground.

In order to attain good road holding properties for a motor vehicle, the height of the vehicle above ground should be held at a minimum within safe limits. Also, for the sake of the greatest comfort, increased elasticity in the structure of the vehicle is required.

Compromises have often been adopted so that the vehicle when empty, should neither stand too high nor be too low when loaded. Another point to be considered is the effect due to centrifugal force upon the vehicle when negotiating a curve, when a tendency will develop for the vehicle to tilt toward the outside, with the resultant discomfort and lack of a feeling of security on the part of the passengers.

It is an object of the present invention to provide for an automatic adjustment in the height of a motor vehicle above ground.

It is a further object to provide a device which will maintain the chassis of a vehicle at a constant height above ground regardless of the total load or its distribution with respect to the wheels, either as a consequence of centrifugal force or due to road conditions.

In accordance with certain features of the invention, I provide an arrangement for a motor vehicle chassis, which is supported by means of springs, wherein the action of the springs in respect to the chassis is applied through the medium of a piston moving through a liquid in an enclosing cylinder. The arrangement is such that if the height of the chassis relative to the wheel axle varies because of a variation in the load on the chassis, the said variation in height is translated through a medium of levers onto the height adjusting device. This device, thus actuated, acts to control the communication between the liquid holding cylinder and a fluid pressure supply or a relief orifice whereby the height of the chassis undergoes a regulation and is brought back to its original level, whereupon the control again becomes inoperative.

In accordance with certain other additional features the height adjusting device is provided with means whereby the control thereof is made to respond to changes in the height of the chassis which persist over a sufficiently long period so that responses to transitory changes will be avoided.

A preferred embodiment of the invention is described hereinafter and illustrated in the appended drawing, in which Fig. 1 is a diagrammatic perspective view of the automatic height-adjusting device in the case of a vehicle provided with a torsion bar spring gear.

Fig. 2 is a sectional view of the height-adjusting device proper.

It will be seen from an inspection of Fig. 1 that it illustrates a torsion bar spring gear. The wheel 1 is mounted at one end of an arm 2 connected with the one end of the torsion bar 3, which is provided with a reaction lever 4. The bearings of the arm and those of the torsion bar on the chassis are omitted. The reaction lever 4 engages a piston 5 slidably received in a cylinder 6 rigidly connected with the chassis. A pipe 7 connects the cylinder 6 with the height-adjusting device. When the junction pipe 7 is closed and filled with liquid, as well as cylinder 6, the reaction lever 4 is resisted by the chassis through the medium of piston 5 and the liquid filling. With a given load acting upon the wheel any alteration in the amount of liquid present in pipe 7 and cylinder 6 will result in a change in the position of lever 4 with respect to the chassis, and consequently in that of the wheel relative to the same.

It will be appreciated that the amount of liquid can be altered in such a manner that irrespective of the load carried by the wheel the latter will retain the same position with respect to the chassis, as will be explained hereinafter.

Although a torsion bar spring gear has been illustrated, the same result may obviously be attained with any other spring gear type, provided it is possible to alter the position of the point at which the spring acts upon the chassis.

The arm 2 to which the wheel 1 is attached is connected with the lever 12 of the height-adjusting device 13 rigid with the chassis through the medium of a link 14. The height-correcting device communicates through a pipe 15 with a pump P, through a pipe 16 with the reservoir R and through pipe 7 with cylinder 6. The pump P and the reservoir R are common to all four wheels of the vehicle.

The height-adjusting device proper consists of a body 13 in which are slidably received a pair of needle valves 17, 18, urged by springs 19 and 20 to close the orifices to which pipes 15 and 16 are connected.

Any angular displacement of a rocking shaft, shown at 21, will result in either needle valve 17 or 18 being lifted away over one half of its circumference to provide a cam designed to cooperate with suitable notches 17a, 18a, milled in the shafts of the respective needle valves.

It is to be noted that a clearance e is provided between the working faces of the notches and those of the cam, so that none of said needle valves will open unless the wheel is displaced in an amount, for example, of 2 centimeters.

Rigid with shaft 21 is an inner lever 22 the free end of which actuates a piston 23 slidably received in a cylinder, the bottom of which communicates with the inside of the height-adjusting device proper, whereas its top can only communicate therewith through a duct 24 through which the flow can be adjusted with the aid of a needle valve 25. The purpose of said piston is to dampen the rocking movement of shaft 21, due to its connection with the lever 12. In order to make the latter connection a resilient one, the lever 12 is made up of spring leaves.

The arrangement just disclosed will operate as follows: Any slow displacement of lever 12, such as will occur for example as the vehicle is loaded, is attended with a corresponding displacement of the piston 23 which acts as a dashpot, at which time one of the needle valves will open. However, whenever the wheel swings rapidly up and down to either side of its mean position, there will not be sufficient time available between two successive oscillations for the piston to move, in which case the needle valves will remain closed.

In road service, the wheels will continuously oscillate to either side of a definite mean position. As long as this position remains unchanged the height-adjusting device remains inoperative, as explained hereinbefore, whereas it will come into action as soon as a displacement takes place for a sufficiently long period with respect to said mean position.

In normal running such a change may occur when a road section of a different gradient is encountered, in which case a portion of the load will be transferred from one axle onto the other. It may also occur where a transversely rather flat road section is succeeded by a cambered section of road, or when negotiating a curve, the transverse distribution of the load is upset by the centrifugal force.

What I claim as my invention and desire to secure by Letters Patent is:

1. A vehicle spring gear provided with means to keep the chassis at substantially constant height above each wheel in spite of the variations that will occur in the load to which the wheel considered is subjected, which comprises, in combination with said wheel and said chassis, a wheel-carrying lever pivoted to said chassis, a cylinder, a piston movably received in said cylinder, means to move said piston in dependency on the load resting on said wheel, a reservoir and a pump, a fluid filling the aforesaid cylinder reservoir and pump, a pipe connecting said reservoir with said pump, a delivery pipe-line between said cylinder and said reservoir, a delivery valve in said delivery pipe-line, spring means urging said delivery valve to close said delivery pipe-line, an admission pipe-line connecting said cylinder with said pump, an admission valve in said admission pipe-line, spring means urging said admission valve to cut off said admission pipe-line, and means actuated by said wheel-carrying lever adapted whenever the angular distance between said lever and said chassis is less than a predetermined value, to open said delivery valve whereby fluid is forced from said cylinder into said reservoir, and whenever the angular distance between said lever and said chassis exceeds a predetermined value, to open said admission valve whereby fluid is forced by said pump from said reservoir into said cylinder.

2. A vehicle spring gear as claimed in claim 1 wherein resilient means are used to move said piston in dependency on the load resting on said wheel.

3. A vehicle spring gear as claimed in claim 1 wherein resilient means in the form of a torsionally stressed bar are used to move said piston in dependency on the load resting on said wheel.

4. A vehicle spring gear provided with means to keep the chassis at substantially constant height above each wheel in spite of the variations that will occur in the load to which the wheel considered is subjected, which comprises, in combination with said wheel and said chassis, a wheel-carrying lever pivoted to said chassis, a cylinder, a piston movably received in said cylinder, resilient means to move said piston in dependency on the load resting on said wheel, a reservoir, a delivery pipe line connecting said cylinder with said reservoir, a delivery valve in said pipe-line resiliently urged into closed position, an admission pipe-line connecting said reservoir with said cylinder, a pump in said admission pipe-line, an admission valve in said admission pipe line resiliently urged into closed position between said pump and said cylinder, a fluid filling said cylinder, said reservoir, said pipe-lines and said pump, and means actuated by said wheel-carrying lever adapted, whenever the load resting on the wheel considered exceeds a predetermined mean value, to open said delivery valve whereby fluid is forced from said cylinder into said reservoir, and whenever the load resting on the wheel considered is less than a predetermined value, to open said admission valve whereby fluid is forced by said pump from said reservoir into said cylinder.

5. A vehicle spring gear provided with means to keep the chassis at substantially constant height above each wheel in spite of variations in the static or dynamic load to which the wheel considered is subjected, which comprises in combination with said wheel and said chassis a swingably-mounted wheel-carrying lever, a cylinder rigid with said chassis, a piston slidably received in said cylinder, means to move said piston in dependency on the load resting on the wheel considered, a casing, a pipe connecting said casing with said cylinder, a reservoir, a pump, a fluid filling said cylinder, said casing, said reservoir and said pump, a pipe connecting said reservoir with said pump, a delivery orifice in said casing, a pipe connecting said delivery orifice with said reservoir, an admission orifice in said casing, a pipe connecting said admission orifice with said pump through which fluid can be forced by said pump from said reservoir to said admission orifice, a pair of needle valves urged by springs respectively to close said delivery orifice and said admission orifice and means adapted, in dependency on the displacements of said wheel-carrying lever, to lift one needle valve clear from the delivery orifice whenever the angular distance from said wheel-carrying lever and said chassis is less than a predetermined value, whereby fluid is forced from said casing into said reservoir, and to lift the other needle valve clear from said admission orifice whenever the angular distance from said wheel-carrying lever to the chassis exceeds a predetermined value, whereby fluid is forced from said casing into said cylinder.

6. A vehicle spring gear as claimed in claim 5, wherein the said means adapted to actuate said needle valves in dependency on the displacements of the wheel-carrying lever comprise a shaft extending through said casing, a cam on said shaft within said casing, notches in said needle valves cooperating with said cam so that said shaft by rocking in one or the other direction will actuate one or the other needle valve, a lever arm keyed on said shaft, a rod connecting said arm with said wheel-carrying lever, and means to deaden the oscillations of said shaft.

7. A vehicle spring gear as claimed in claim 6, wherein the oscillations of the rocking shaft are deadened by means of a dash-pot.

8. A vehicle spring gear as claimed in claim 5, wherein the said means adapted to actuate said needle valves in dependency on the displacements of the wheel-carrying lever comprise a shaft extending through said casing, a cam on said shaft within said casing, notches in said needle valves cooperating with said cam so that said shaft by rocking in one or the other direction will actuate one or the other needle valve, a lever arm keyed on said shaft, a rod connecting said arm with said wheel-carrying lever, and means to deaden the oscillations of said shaft, said lever arm being flexible.

GEORGES LEVESQUE du ROSTU.

REFERENCES CITED

The following references are of record in the file of this patent:

UNITED STATES PATENTS

| Number | Name | Date |
|---|---|---|
| 2,042,596 | Gouirand | June 2, 1936 |
| 2,191,211 | Krotz | Feb. 20, 1940 |